Figure 1:
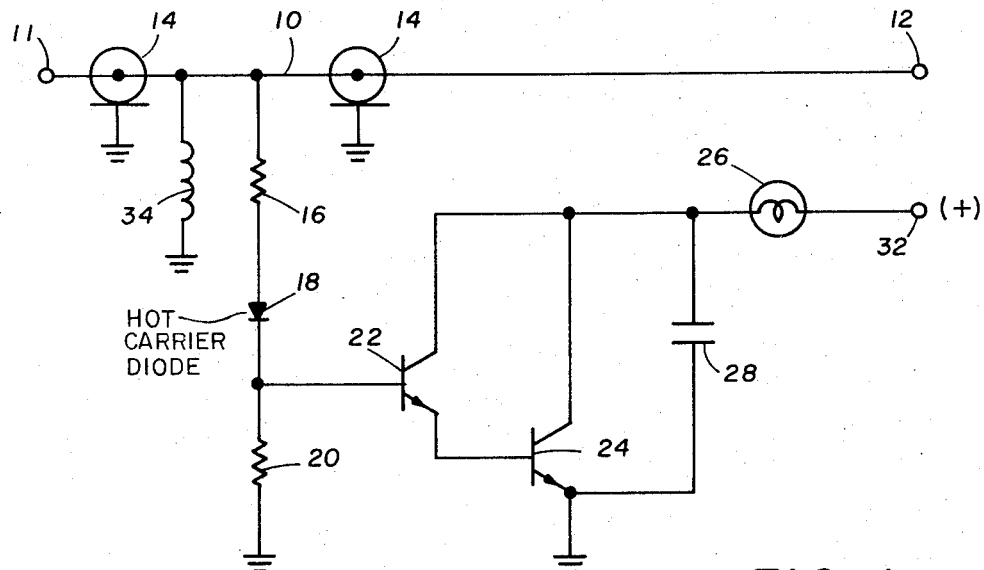

United States Patent [19]
Lenert et al.

[11] 3,832,703
[45] Aug. 27, 1974

[54] APPARATUS FOR DETECTING SIGNAL TRANSMISSION

[75] Inventors: Richard W. Lenert; Edward A. Rose, Jr., both of Annandale, Va.

[73] Assignee: LTV Electrosystems, Inc., Greenville, Tex.

[22] Filed: June 4, 1973

[21] Appl. No.: 366,517

Related U.S. Application Data

[63] Continuation of Ser. No. 171,907, Aug. 16, 1971, abandoned.

[52] U.S. Cl............ 340/248 R, 178/69 G, 307/318, 340/253 R
[51] Int. Cl. ............................................ G08b 21/00
[58] Field of Search ........... 340/248, 253, 255, 256; 178/69 G; 325/21, 22, 364; 317/18 R; 307/318

[56] References Cited
UNITED STATES PATENTS

| | | | |
|---|---|---|---|
| 1,284,609 | 11/1918 | Creighton | 340/248 C UX |
| 2,764,753 | 9/1956 | Martin | 340/253 E |
| 3,020,529 | 2/1962 | Turner | 340/253 R |
| 3,133,275 | 5/1964 | Cohrt et al. | 340/253 B |
| 3,278,802 | 10/1966 | Fanin et al. | 317/18 R |
| 3,573,780 | 4/1971 | Butterbaugh | 340/248 B |

OTHER PUBLICATIONS

Hot Carrier Diodes Switch in Pica seconds by Krakauer et al.; Electronics. July 19, 1963; pages 53–55.

*Primary Examiner*—John W. Caldwell
*Assistant Examiner*—Daniel Myer
*Attorney, Agent, or Firm*—Richards, Harris & Medlock

[57] ABSTRACT

A broadband coupler tied to a transmission line directs a portion of signal energy on the line to a diode signal detector. The signal detector responds to the energy directed from the transmission line through the coupler to produce a transmission signal current during the presence of a signal on the line. This transmission signal current activates a high input impedance transistorized switch having an indicator lamp energized by the closing of the switch. Only during the transmission of a signal and the energization of the indicator lamp does the circuit require energy from a supply source.

4 Claims, 2 Drawing Figures

PATENTED AUG 27 1974   3,832,703

INVENTORS:
RICHARD W. LENERT
EDWARD A. ROSE, JR.

ATTORNEYS

APPARATUS FOR DETECTING SIGNAL TRANSMISSION

This is a continuation of Application Ser. No. 171,907, filed Aug. 16, 1971, now abandoned.

This invention relates to signal detection, and more particularly to the detection of a signal on a transmission line.

Under many operating conditions there is a necessity to determine whether a signal is being transmitted over a particular section of transmission line. For example, in the field of aviation radio communications, there is often a need to know whether or not a transmitter is keyed, that is, transmitting. In this field, an existing problem is that a transmitter may be inadvertently keyed thereby tying-up or jamming a particular frequency for many miles (up to several hundred depending upon altitude and power) around the aircraft containing the inadvertently keyed transmitter. This renders that particular frequency unusable for other aircraft. The problem is particularly acute in smaller general aviation aircraft when no other source of communication exists between a ground based station and the aircraft pilot. When a transmitter is inadvertently keyed, the particular frequency may be jammed and unusable for extended periods of time.

In addition to radio communications in aircraft, there are other applications where it is desirable to monitor the presence of a signal on a transmission line. As with the aircraft application, it is frequently advantageous to have a signal monitor that requires a source of energizing power only during the detection of a transmitted signal. Another requirement of such signal detectors, especially for aircraft transmitters, is that the detector be capable of operation over a broadband of frequencies. There are numerous signal detection systems which are limited to narrow frequency bands of operation, primarily due to the coupler configuration for directing signal energy to a signal detector.

In accordance with the present invention, apparatus for detecting the presence of a signal on a transmission line includes a broadband resistance coupler tied to the transmission line for generating a voltage during the presence of a signal. A detector connected to the broadband coupler responds to the voltage to pass a transmission signal current. This transmission signal current actuates a switch into a conducting state thereby energizing an alarm connected to the switch.

In accordance with the present invention, energy from the transmitted signal activates an alarm controlling switch thereby eliminating the necessity of a continuously operating source of power.

A more complete understanding on the invention and its advantages will be apparent from the specification and claims and from the accompanying drawings illustrative of the invention.

Figure 2:
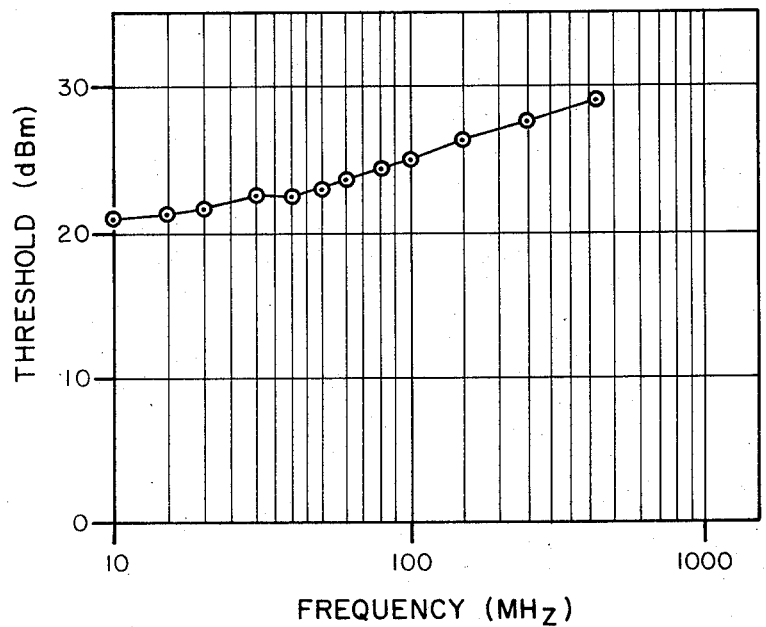

Referring to the drawings:

FIG. 1 is a schematic of a signal detection system coupled to the transmission line between a transmitter and an antenna; and FIG. 2 is plot of frequency as a function of signal threshold in dB illustrating the sensitivity of the detector of FIG. 1 at various frequencies.

Referring to the FIGURES, a transmitter (not shown) having an output applied to a coaxial RF transmission line 10 at a terminal 11 generates signals for transmission on the line to an antenna system (not shown) coupled to a terminal 12. The coaxial transmission line 10 is shielded at points 14 with the shield connected to ground.

To detect the transmission of a signal on the line 10, a resistance coupler 16 is connected thereto to divert a fraction of the signal energy to a diode detector 18. A resistance coupler provides a non-reactive load to the RF transmission line 10 while maintaining less than a 1.1 to 1.0 VSWR, assuming a 50 ohm termination at the terminal 12.

Connected to the diode detector 18 is a base bias resistor 20 for establishing a base drive signal to a transistor switch including transistors 22 and 24 connected in a Darlington configuration. A Darlington transistor configuration provides a solid state circuit with a high input impedance at the connection of the diode coupler 18 and the base bias resistor 20. Connected to the interconnection of the collector electrodes of the transistors 22 and 24 is an indicator lamp 26 and connected between the emitter electrode of the transistor 24 and the lamp 26 is a capacitor 28. The second terminal of the lamp 26 connects to a power supply (not shown) at a terminal 32. One of the important advantages of the detector of the present invention is that the power supply tied to the terminal 32 is the only voltage source required.

To eliminate static charges on the transmission line 10, an inductor 34 is tied to the line. The inductor provides a DC return path to ground for static charges on the transmission line. Under certain operating conditions, the inductor 34 will not be required.

In operation of the circuit of FIG. 1, a portion of the energy transmitted over the line 10 is directed to the diode detector 18 by the resistance coupler 16. A voltage drop is developed across the resistance coupler 16 which forward biases the diode detector 18 thereby producing a signal transmission current through the base bias resistor 20. A voltage is developed across the resistor 20 which biases the transistor 22 into a conducting state which in turn biases the transistor 24 into a conducting state. Condution of transistors 22 and 24 completes a circuit through the indicator lamp 26 from a power supply tied to the terminal 32. The indicator lamp glows indicating that a signal is being transmitted over the line 10. Only during the transmission of a signal over the line 10, will energy be consumed by the detector from the power supply tied to the terminal 32.

Assuming a 50 ohm transmission line, the detector circuit will present a high impedance load at the connection to the line with resulting in very low losses. Assuming also that the impedance of the antenna system tied to the terminal 12 is 50 ohms, the relative power delivered to the detector circuit with reference to that delivered to the antenna system is on the order of 0.09 dB.

In one embodiment of the present invention, the components employed in the circuit illustrated in the drawings were as follows:

| Component | Value | |
|---|---|---|
| Resistance Coupler 16 | 2.4 | K ohms |
| Resistor 20 | 22 | K ohms |
| Inductor 34 | 1.8 | $\mu$h |
| Capacitor 28 | 0.1 | $\mu$f |
| Transistors 22 and 24 | 2N2222A | |
| Diode Detector 18 | A hot carrier diode (that is, a Shottky diode) | |

The circuit was coupled to a 50 ohm transmission line into a 50 ohm antenna system and was experimentally tested with a King Radio type KY-90A and a Collins Radio type 618 M1 transmitter.

Performance characteristics for the tested circuit are illustrated in FIG. 2 with signal threshold in dB plotted against frequency in MHz. The signal threshold increased from slightly more than 20 dBm at 10 MHz to slightly less than 30 dBm at about 450 MHz. Note, that the system operates with only about a 7 dB change in threshold sensitivity over a frequency range that is in excess of 5 octaves. Thus, the system operates over a broadband of frequencies.

To trigger the indicator lamp 26, with the circuit values listed, a signal of about 1 watt was required on the transmission line 10. Greater sensitivity can be accomplished (that is, lower signal power required) by using a smaller value resistance coupler than the 2.4 K ohms. This, however, will necessarily increase the power loss from the transmitted signal. Conversely, for a less sensitive system the value of the resistance coupler 16 may be increased over the 2.4 K ohm value listed. This would then reduce the power loss to the transmitted signal. It should be noted that with the system values given only a very small signal power loss results.

As a further modification to increase the sensitivity of the system without increasing the signal power loss, the transistors 22 and 24 may be biased in a conventional manner. This, however, results in a power supply being required at all times during the operation of the detector system, whether a signal is present or not on the transmission line 10. When biasing the transistors 22 and 24 they are partially conducting thereby reducing the base bias voltage required at the resistor 20.

It should be understood, that modifications and variations of the present invention are possible in light of the above teachings. It is therefore to be understood that within the scope of the appended claims the invention may be practiced otherwise than as specifically described.

We claim:

1. Apparatus for detecting the transmission of video signals over a transmission line comprising:
   detector means resistively coupled to said transmission line and responsive to the transmission of a signal on said line to pass a transmission signal current,
   voltage dropping means connected in a series circuit with said detector means to generate a base drive voltage at the junction with said detector means that varies with the transmission signal current,
   a first transistor having a base electrode connected to the junction of said detector means and said voltage dropping means and operated into a conducting state in response to the base drive voltage,
   a second transistor connected to said first transistor in a Darlington configuration and having a collector electrode connected to the collector electrode of said first transistor, and
   alarm means having one terminal connected to the collector electrodes of said transistors and a second terminal connected to a supply source to be actuated from the supply source when said first transistor operates into a conducting state in response to the base drive voltage.

2. Apparatus for detecting transmission of a signal over a transmission line as set forth in claim 1 wherein said detector means is a hot carrier diode having a fast switching response characteristic.

3. Apparatus for detecting the transmission of a signal over a transmission line as set forth in claim 2 wherein said voltage dropping means includes a resistor connected in series with said diode and to the base electrode of said first transistor to generate a base drive voltage therefor.

4. Apparatus for detecting the transmission of a signal over a transmission line as set forth in claim 1 including inductor means tied to the transmission line and to ground to provide a D.C. return path to ground for static charges on the transmission line.

* * * * *

PO-1050
(5/69)

UNITED STATES PATENT OFFICE
CERTIFICATE OF CORRECTION

Patent No. 3,832,703  Dated August 27, 1974

Inventor(s) Richard W. Lenert and Edward A. Rose, Jr.

It is certified that error appears in the above-identified patent and that said Letters Patent are hereby corrected as shown below:

Assignee, "LTV Electrosystems, Inc" should be --E-Systems, Inc-- (Recorded on Reel 2859, Frame 406)

Col. 2, line 41, "Condution" should be --Conduction--.

Signed and sealed this 19th day of November 1974.

(SEAL)
Attest:

McCOY M. GIBSON JR.
Attesting Officer

C. MARSHALL DANN
Commissioner of Patents